US011965957B2

(12) United States Patent
Salomon et al.

(10) Patent No.: US 11,965,957 B2
(45) Date of Patent: Apr. 23, 2024

(54) ULTRASONIC SENSOR WITH POWERLINE COMMUNICATION

(71) Applicant: Valeo Schalter und Sensoren GmbH, Bietigheim-Bissingen (DE)

(72) Inventors: Sylvio Salomon, Bietigheim-Bissingen (DE); Thomas Jung, Bietigheim-Bissingen (DE); Steffen Jaeger, Bietigheim-Bissingen (DE)

(73) Assignee: VALEO SCHALTER UND SENSOREN GMBH, Bietigheim-Bissingen (DE)

(*) Notice: Subject to any disclaimer, the term of this patent is extended or adjusted under 35 U.S.C. 154(b) by 751 days.

(21) Appl. No.: 17/043,917

(22) PCT Filed: Mar. 28, 2019

(86) PCT No.: PCT/EP2019/057824
§ 371 (c)(1),
(2) Date: Feb. 25, 2021

(87) PCT Pub. No.: WO2019/192919
PCT Pub. Date: Oct. 10, 2019

(65) Prior Publication Data
US 2021/0255317 A1    Aug. 19, 2021

(30) Foreign Application Priority Data
Apr. 3, 2018 (DE) .................. 10 2018 107 827.7

(51) Int. Cl.
*G01S 15/10* (2006.01)
*B60Q 9/00* (2006.01)
(Continued)

(52) U.S. Cl.
CPC .............. *G01S 15/10* (2013.01); *B60Q 9/006* (2013.01); *G01S 15/931* (2013.01); *G01S 7/5202* (2013.01)

(58) Field of Classification Search
CPC ........................ G06K 9/00221–00389; G06T 2207/30196–30201; H04N 5/23219;
(Continued)

(56) References Cited

U.S. PATENT DOCUMENTS 3,404,338 A * 10/1968 Cannon .................. H04L 43/50
324/621
4,015,366 A * 4/1977 Hall, III .................. A01G 3/04
193/25 E
(Continued)

FOREIGN PATENT DOCUMENTS

CN  102138081 A   7/2011
CN  105738902 A   7/2016
(Continued)

OTHER PUBLICATIONS

International Search Report and Written Opinion in corresponding International Application No. PCT/EP2019/057824, dated Jul. 4, 2019 (11 pages).
First Office Action in corresponding Chinese Application No. 201980024842.1, dated May 23, 2023 (29 pages).

*Primary Examiner* — Daniel L Murphy
*Assistant Examiner* — Amie M Ndure
(74) *Attorney, Agent, or Firm* — Osha Bergman Watanabe & Burton LLP

(57) ABSTRACT

The invention relates to an ultrasonic sensor (112) for use in a distance detection system (110) for a vehicle (111), wherein the ultrasonic sensor (112) is designed to be installed jointly with at least one other ultrasonic sensor (112), the ultrasonic sensor (112) has a first input (114) for connection to a supply lead (116), the ultrasonic sensor (112)
(Continued)

Figure 1:
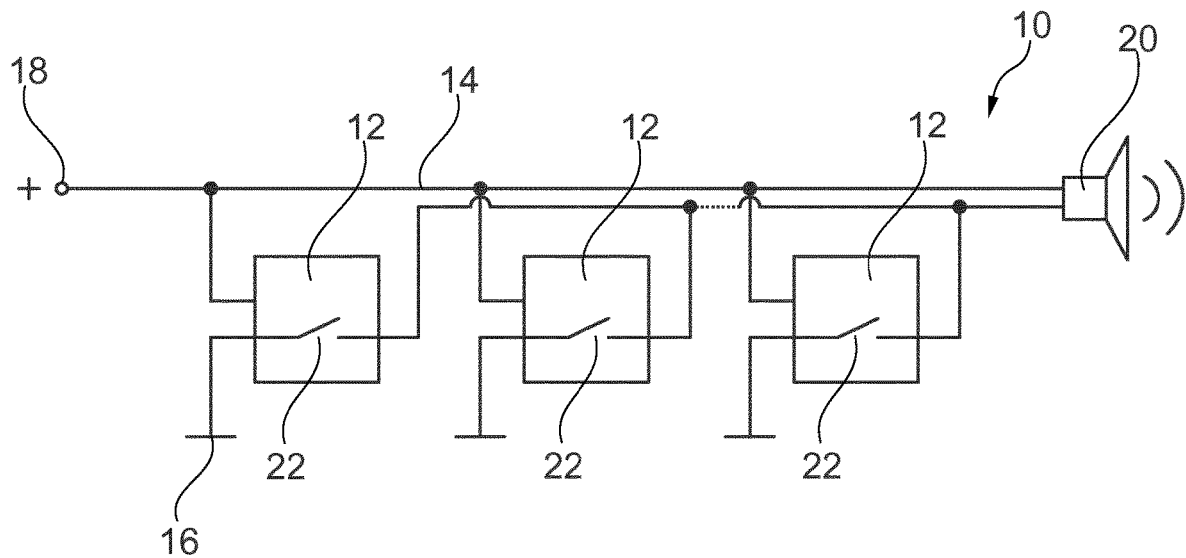

has a second input (118) for connection to a ground potential (120) of the vehicle (111), and the ultrasonic sensor (112) has an output (122) for connection to the supply lead (116), wherein the ultrasonic sensor (112) is designed to receive a data signal modulated on the supply lead (116) via the first input (114) and to modulate a data signal onto the supply lead (116) via the output (122). The invention also relates to a distance detection system (110) for a vehicle (111) having a plurality of the above ultrasonic sensors (112), wherein the ultrasonic sensors (112) are connected to each other in the form of a chain, the output (122) of a preceding ultrasonic sensor (112) being connected to the first input (114) of a subsequent ultrasonic sensor (112), a first ultrasonic sensor (112) in the chain is connected with its first input (114) to a supply voltage (124), and a final ultrasonic sensor (112) in the chain is connected with its output (122) to a signalling unit (128).

14 Claims, 2 Drawing Sheets

(51) Int. Cl.
*G01S 7/52* (2006.01)
*G01S 15/931* (2020.01)

(58) Field of Classification Search
CPC .......... H04N 21/4223; H04N 21/44218; G06F 17/30793; A61B 5/1176; G01S 7/003; G01S 15/10; G01S 15/931; G01S 7/5202; G01S 15/87; B60Q 9/006
See application file for complete search history.

(56) References Cited

U.S. PATENT DOCUMENTS

| | | | | |
|---|---|---|---|---|
| 4,878,050 | A | * | 10/1989 | Kelley .................... B60R 25/04 307/10.6 |
| 6,897,768 | B2 | * | 5/2005 | Sato .................... G01S 7/52004 340/505 |
| 2003/0034883 | A1 | * | 2/2003 | Sato .................... G01S 7/52004 701/45 |
| 2003/0090569 | A1 | * | 5/2003 | Poechmueller ...... B60Q 1/0023 348/E7.086 |
| 2006/0016262 | A1 | * | 1/2006 | Sato ...................... G01S 15/931 73/579 |
| 2006/0273927 | A1 | | 12/2006 | Sato |
| 2010/0245066 | A1 | | 9/2010 | Sarioglu et al. |
| 2014/0318244 | A1 | * | 10/2014 | Tsutsumi ........... G01C 19/5776 73/504.12 |

FOREIGN PATENT DOCUMENTS

| | | | | |
|---|---|---|---|---|
| CN | 105849588 A | | 8/2016 | |
| CN | 106461778 A | | 2/2017 | |
| DE | 10325374 A1 | | 12/2004 | |
| DE | 102011087842 A1 | | 6/2013 | |
| DE | 102012222891 A1 | | 6/2014 | |
| DE | 102012222891 A1 | * | 6/2014 | ............ B60R 16/00 |
| DE | 102013021328 A1 | | 6/2015 | |
| EP | 0952460 A2 | | 10/1999 | |
| EP | 2326969 A1 | * | 6/2011 | ........... G01S 15/878 |
| JP | 2013083569 A | | 5/2013 | |
| WO | 2009040155 A1 | | 4/2009 | |
| WO | 2009130725 A1 | | 10/2009 | |
| WO | WO-2009130725 A1 | * | 10/2009 | ........... G01S 15/931 |
| WO | 2010-025864 A1 | | 3/2010 | |
| WO | 2015090842 A1 | | 6/2015 | |

* cited by examiner

ULTRASONIC SENSOR WITH POWERLINE COMMUNICATION

The present invention relates to an ultrasonic sensor for use in a distance detection system for a vehicle, wherein the ultrasonic sensor is designed to be installed jointly with at least one other ultrasonic sensor.

The present invention also relates to a distance detection system for a vehicle having a plurality of the above ultrasonic sensors.

Modern distance detection systems are mostly based on ultrasonic sensors, which are mounted on a front and/or a rear of the vehicle, for example. The ultrasonic sensors can be mounted on the front or rear of the vehicle in or on a bumper. In the simplest case, the ultrasonic sensors emit an ultrasonic signal, for example as an ultrasonic pulse. Based on echoes of ultrasound signals received by the ultrasonic sensor, an environment around the vehicle is captured, usually in an area behind and/or in front of the vehicle. Each of the ultrasonic sensors is therefore designed to emit ultrasonic signals on the one hand and to receive the echoes produced by nearby objects on the other. The evaluation of these echoes enables inferences to be made as to the positions and the spatial extent of the objects, in particular for the detection of nearby obstacles in a driving path.

The activation of the ultrasonic sensors, the readout and processing of the measurement data and the generation of information based thereon to inform the driver about a situation in the vicinity of the vehicle are usually carried out by means of a dedicated control unit. In this case each of the ultrasonic sensors is individually connected to the control unit, so that the control unit evaluates sensor information from the individual ultrasonic sensors together. Based on this, a distance from the vehicle to the obstacle can be determined and a warning can be issued with a warning device based on this distance. Alternatively, the warning can also be issued without determining the distance, by simply making a rough classification into, for example, nearby objects, objects a medium distance away, and distant objects. The warning is usually issued with a loudspeaker as a warning device, for example by issuing a characteristic beep depending on the distance from the object. In addition or alternatively, the warning device may comprise a display that can indicate a distance from the obstacle. Accordingly, the distance detection systems considered here can also be referred to as distance warning systems, which generate a warning if various distances between the vehicle and an object become too small.

A large part of the cost of such distance detection systems is caused by the control unit. One way to reduce system costs significantly is based on the idea of eliminating the control unit. Other positive effects of such a measure are savings in mass and reduced space requirements.

A corresponding method for controlling sensors, in particular for ultrasonic distance detection systems in a vehicle, is known from WO 2010/025864 A1, for example. In that method the sensors communicate with a signalling device for predefined distance detection. Each sensor from a plurality of sensors is prompted by a signal triggered by a random generator to generate a send signal. The distance is then determined on the basis of the ultrasonic signal reflected by an object and used directly to control the signalling device. The ultrasonic sensors thus synchronize themselves automatically and can directly control a tone generator for the acoustic output of distance information.

An example of such a distance detection system 10 from the cited prior art is illustrated in FIG. 1. The system comprises a plurality of ultrasonic sensors 12, which are arranged in parallel between an electrical supply lead 14 and a ground 16. The supply lead 14 is connected on one side to a supply voltage 18 and on another side to a warning unit 20. A ground output of the warning unit 20 is also connected in parallel with the plurality of ultrasonic sensors 12. Each ultrasonic sensor 12 has a switch 22 to connect the ground output of the warning unit 20 to the ground 16. Thus, by closing its switch 22, each ultrasonic sensor 12 can generate a current through the warning unit 20 to signal an object in an area monitored by the ultrasonic sensors 12.

In this very simple and cost-effective system, however, echoes of an ultrasonic pulse generated by an ultrasonic sensor cannot be evaluated meaningfully by another ultrasonic sensor, which means that the detection range is comparatively small. If only the smallest directly measured distance to an object is signalled by all ultrasonic sensors, it might also be the case that the shortest distance between the object and the vehicle is smaller anyway, because a unique object localization, for example on the basis of trilateration, is not possible with this system.

Patent DE 103 25 374 A1 discloses an electronic system comprising a number of ultrasonic sensors, one of which is designed as a master sensor. The system therefore requires no control unit. The ultrasonic sensors can communicate with each other, and the ultrasonic sensor which is operated as the master controls at least one other ultrasonic sensor, which is operated as a slave. The positions of all ultrasonic sensors must be stored in the master and uniquely assigned, which requires additional measures that usually involve extra cost. This also increases the complexity of the system, which also requires more complicated assembly.

On the basis of the above-mentioned prior art, the object of the invention is therefore to specify an ultrasonic sensor for use in a distance detection system for a vehicle, and a distance detection system for a vehicle having a plurality of ultrasonic sensors of the above-mentioned type, which combine the advantages of a simple and cost-effective implementation, a comparatively large detection range and reliable object detection.

The object is achieved according to the invention by the features of the independent claims. Advantageous refinements of the invention are specified in the dependent claims.

According to the invention an ultrasonic sensor for use in a distance detection system for a vehicle is therefore specified, wherein the ultrasonic sensor is designed to be installed jointly with at least one other ultrasonic sensor. The ultrasonic sensor has a first input for connection to a supply lead, the ultrasonic sensor also has a second input for connection to a ground potential of the vehicle, and the ultrasonic sensor has an output for connection to the supply lead. The ultrasonic sensor is designed to receive a data signal modulated onto the supply lead via the first input, and to modulate a data signal onto the supply lead via the output.

According to the invention, a distance detection system for a vehicle having a plurality of the above ultrasonic sensors is also specified, wherein the ultrasonic sensors are connected to each other in the form of a chain, the output of a preceding ultrasonic sensor is connected to the first input of a subsequent ultrasonic sensor, a first ultrasonic sensor in the chain is connected with its first input to a supply voltage, and a final ultrasonic sensor in the chain is connected with its output to a signalling unit.

The basic idea of the present invention is therefore to provide ultrasonic sensors that can communicate with each other via a supply lead, so that the ultrasonic sensors can interact without any additional control device. Data transfer between the ultrasonic sensors takes place on the basis of power-line communication (PLC). This enables simple communication between the ultrasonic sensors. The communication via the supply lead is simple to implement and allows a simple means of setting up the respective ultrasonic sensors. The ultrasonic sensors are also designed for joint installation in the form of a chain. In principle, identical ultrasonic sensors can be used to form such a chain, which facilitates their assembly and the ultrasonic sensors can be provided in larger quantities at low cost. Each sensor can still function differently in the chain, especially as the first or last ultrasonic sensor of the chain.

The concatenation of the ultrasonic sensors enables a chain to be formed, wherein each ultrasonic sensor is supplied with electrical energy via the ultrasonic sensor that precedes it. In this way, the wiring between the ultrasonic sensors can be reduced to a minimum. Also, the distance detection system as a whole can be installed very easily with just one connection to a supply voltage.

The ultrasonic sensor has an inherently standard structure with an ultrasonic diaphragm and a transducer, usually a piezoelectric transducer. In addition, the ultrasonic sensor comprises a modulator and a demodulator to receive the data signal modulated onto the supply lead and to modulate the data signal onto the supply lead.

Functional principles of ultrasonic sensors for distance determination are known as such and will not be explained separately here.

The first input is used to connect to the supply lead. Together with the second input for connection to a ground potential of the vehicle and the first input, a two-pole supply of the ultrasonic sensor is formed.

The supply lead is thus continued by the individual ultrasonic sensors. The supply lead is thus formed by individual cable sections, which are connected to each other via the ultrasonic sensors. Alternatively, however, a galvanic isolation can also be implemented in the ultrasonic sensor, for example.

In principle, the data signal can be modulated and demodulated in different ways. Various methods for generating a suitable modulation are known as such in the prior art. The modulation of the data signal causes the supply lead to be used for transmitting data between the ultrasonic sensors, so that communication can take place from an ultrasonic sensor to a downstream ultrasonic sensor.

The modulated data signal is received via the first input, i.e. the data signal is modulated together with the supply via the supply lead. A demodulator in the ultrasonic sensor detects and decodes the data signal. In addition, the data signal can include an addressing mechanism to perform a data transfer to a specific ultrasonic sensor.

The same applies to the output of the ultrasonic sensor for connection as a supply lead. The supply of subsequent ultrasonic sensors is thus effected via all of the preceding ultrasonic sensors. The supply voltage is modulated accordingly on the supply lead in order to transmit data signals.

The distance detection system is designed to perform ultrasonic measurements with the ultrasonic sensors to determine objects or their distances and/or positions by means of echoes of emitted ultrasound pulses.

In an advantageous embodiment of the invention the ultrasonic sensor is designed to receive a data signal modulated onto the supply lead via the output, and to modulate a data signal onto the supply lead via the first input. Accordingly, communication can take place not only from an ultrasonic sensor located earlier in the chain to an ultrasonic sensor located downstream, but in fact in any direction. In particular, each data signal can be issued in such a way that in principle, every additional ultrasonic sensor can receive the modulated data from the supply lead. This only requires that the supply lead is connected through the respective ultrasonic sensors. Otherwise, each ultrasonic sensor would have to receive and re-modulate the modulated signal, either from its first input to its output, or vice versa. Thus, each ultrasonic sensor only needs a device for generating a data signal modulated onto the supply lead and a corresponding device for receiving a data signal modulated onto the supply lead. The devices for generating a data signal modulated onto the supply lead and for receiving a data signal modulated onto the supply lead are preferably positioned between a switching device and the first input, the switching device being arranged in a connecting cable between the first input and the output.

In an advantageous design of the invention, the ultrasonic sensor is designed to receive an initialization message as a modulated data signal on the supply lead, and to issue an initialization message as a modulated data signal on the supply lead. The received initialization message can thus serve as the basis for initializing a single ultrasonic sensor. Since each ultrasonic sensor can in turn send its own initialization message to a subsequent ultrasonic sensor, all ultrasonic sensors are initialized in a cascade. For example, if an ultrasonic sensor detects during its initialization that it is the last ultrasonic sensor in the ultrasound sensor chain, no further initialization message needs to be sent by this ultrasonic sensor. Accordingly, the ultrasonic sensor can also perform an initialization if it does not receive an initialization message as a modulated data signal. In this case, the ultrasonic sensor detects the absence of the initialization message, so that the ultrasonic sensor recognizes that it must be the first ultrasonic sensor in the chain. For example, this initialization as the first ultrasonic sensor is carried out after a timer has expired, if no initialization message has been received in the time.

The initialization is preferably based on the content of the initialization message. For example, in the initialization message it sends, the first ultrasonic sensor can signal that it is the first ultrasonic sensor. Accordingly, signalling can be continued via the initialization messages so that each ultrasonic sensor knows its position in the chain. In addition, if the subsequent ultrasonic sensor is activated by the previous ultrasonic sensor by the fact that the previous ultrasonic sensor switches on the supply voltage at its output, the initialization of the chain can be performed very easily.

In an advantageous embodiment of the invention, the ultrasonic sensor has a memory with predefined positions for the arrangement of the ultrasonic sensor in a chain of ultrasonic sensors, and the ultrasonic sensor is designed to initialize its position in the chain of ultrasonic sensors based on the receipt of the initialization message and the predefined positions in the memory. For example, the ultrasonic sensors may contain generic information regarding predefined positions in their memory, or vehicle-specific information. In the latter case, identically designed ultrasonic sensors can be restricted for use in a particular vehicle by the information contained in their memory. For example, the memory can be implemented as a lookup table. In addition, the memory may contain items of information related to specified measurement sequences for performing distance measurements depending on their position in the chain or in the vehicle.

In an advantageous embodiment of the invention, the ultrasonic sensor is designed to perform an initialization when a supply voltage is applied to the first input. The initialization thus takes place, for example, when the vehicle ignition is switched on. If the distance detection system is not activated until it is used, for example with a switch in the supply lead, the initialization is carried out upon each use. Particularly in combination with a sequential supply of the ultrasonic sensors, for example, if each ultrasonic sensor activates its output after its own initialization, a simple and efficient initialization of all ultrasonic sensors in the chain can take place.

In an advantageous embodiment of the invention, the ultrasonic sensor has a switching device to disconnect or to connect in a conductive manner a connecting lead between the first input and the output, wherein the switching device is open in an initial state, and the ultrasonic sensor is designed to be able to close the switching device after initialization. The connecting lead is therefore connected through the respective ultrasonic sensor when the switching device is closed. The chain of ultrasonic sensors can thus be activated sequentially starting with a first ultrasonic sensor, which is directly connected to a vehicle power supply. In the case of a final ultrasonic sensor in the chain, the ultrasonic sensor can close the switching device in order thereby to activate a downstream signalling unit, for example, in order to activate an acoustic signal generator with a desired frequency and intensity. In the case of the final ultrasonic sensor, the switching device can be activated differently.

In an advantageous embodiment of the invention, the ultrasonic sensor is designed to perform an initialization of its position in a chain of ultrasonic sensors, and the ultrasonic sensor is designed to perform an activation of a signalling unit via its switching device when its position as the last ultrasonic sensor of the chain is initialized. In the case of an acoustic signal generator, the downstream signalling unit can be activated by specifying a desired signal frequency and amplitude. The type of activation depends, for example, on the distances or angles with respect to objects in the vehicle environment measured and communicated by all ultrasonic sensors. The supply voltage is applied to the signalling unit via the switching device of the last ultrasonic sensor of the chain.

In an advantageous embodiment of the invention the ultrasonic sensor is designed to perform an ultrasonic measurement and to send a signal with information from a received echo of an ultrasound pulse emitted by the ultrasonic sensor as a modulated data signal on the supply lead. The echo can be evaluated to determine the distance of an object from the ultrasonic sensor. In principle, it might be possible, in addition or as an alternative, to evaluate the echo to determine an angular position of the object in relation to the ultrasonic sensor. The signal with the information from a received echo can contain sensor information of the ultrasonic sensor, i.e. a determined signal time-of-flight of a reflected ultrasound pulse, a distance indication determined from it, and/or an angular position of the object. In addition, the signal with the information from the received echo can contain a distance value as the measured distance, or it can merely specify a range, such as a nearby object, an object at a medium distance, or a far away object. The signal with the information from the received echo can thus be transmitted to an ultrasonic sensor as the master or to a final ultrasonic sensor in the chain, so that the respective ultrasonic sensor can control a signalling unit accordingly.

In an advantageous embodiment of the invention the ultrasonic sensor is designed to send a signal including information from a received echo of an ultrasound pulse as a modulated data signal on the supply lead. The echo can be received independently of an ultrasonic pulse emitted by the ultrasonic sensor itself. The information from the received echo can be processed by a different ultrasonic sensor using additional knowledge about emitted ultrasound pulses. The information from the received echo can therefore comprise a time stamp. Alternatively or in addition, the information may comprise items of information about the received echo, such as an echo intensity, duration, encoding, or other.

In an alternative embodiment of the invention one of the ultrasonic sensors is configured as a master in order to control the ultrasonic sensors jointly. The master can actively control the remaining ultrasonic sensors in order to synchronize measurements. Also, the ultrasonic sensor as the master can output a warning depending on a detected object. The ultrasonic sensor as master can receive sensor information, i.e. signal propagation times of reflected ultrasound pulses or distance data or angle data determined therefrom, from all ultrasonic sensors and can output the warning based on this.

In an advantageous embodiment of the invention, the ultrasonic sensors are arranged and designed to perform a sequential initialization in a sequence of their concatenation. This means the ultrasonic sensors can be easily assigned to their respective positions in the chain. This can be used, for example, to assign the positions of the ultrasonic sensors on the vehicle.

In an advantageous embodiment of the invention, the distance detection system is designed to perform a synchronized distance measurement with a plurality of ultrasonic sensors. Thus, for example, indirect signal paths of radiated ultrasound pulses can be taken into account, i.e. one of the ultrasonic sensors emits ultrasonic pulses and a plurality of ultrasonic sensors receive echoes of these ultrasonic pulses. Knowing the positions of the ultrasonic sensors in the chain and the positions of the ultrasonic sensors on the vehicle, it is possible, for example, to perform a trilateration based on echoes received with different ultrasonic sensors and the distances to objects derived from them, and/or a triangulation based on echoes received with different ultrasonic sensors and angles relative to objects determined from them.

In an advantageous embodiment of the invention, the distance detection system is designed to perform a measurement sequence with a plurality of ultrasonic distance measurement sensors, wherein the ultrasonic sensors perform the measurement sequence jointly depending on their position in the chain. Thus, for example, a synchronized detection of objects can be carried out jointly with a plurality of ultrasonic sensors, wherein the different ultrasonic sensors function differently. Such a determination of the distances of objects goes beyond a detection using exclusively direct signal paths from an ultrasonic sensor to the object and back again to the same ultrasonic sensor. Echoes of an ultrasonic pulse generated by an ultrasonic sensor can therefore be received and evaluated by other ultrasonic sensors, which also increases the detection range. It also ensures that, for example, the shortest distance between the object and the vehicle is always correctly detected. The distance measurements can be carried out, for example, according to defined measuring sequences, which are stored in each of the ultrasonic sensors for each potential position of an ultrasonic sensor in the vehicle. As a result, based on a known position in the chain of ultrasonic sensors, the appropriate action for each ultrasonic sensor can be carried out according to the measuring sequence.

In an advantageous embodiment of the invention, the distance detection system is designed to perform an ultrasonic measurement, wherein at least one of the ultrasonic sensors emits an ultrasonic pulse, and one or more of the ultrasonic sensors are designed to send a signal including information of a received echo of the ultrasonic pulse emitted by the at least one of the ultrasonic sensors as a modulated data signal on the supply lead. The distance detection system can therefore perform a combined ultrasonic measurement with multiple ultrasonic sensors, wherein several different ultrasonic sensors can receive echoes of ultrasonic pulses. Compared to the receiving of ultrasound echoes with only the ultrasonic sensor that emitted the ultrasound pulse, an improved detection of objects in the environment of the ultrasonic sensors can be achieved. The echoes can be evaluated in the usual manner to determine a distance of an object from the respective ultrasonic sensor. In addition, the echoes can also be evaluated jointly. In principle, it might be possible, in addition or as an alternative, to evaluate the echoes to determine an angular position of the object in relation to the ultrasonic sensor. Each signal with the information from a received echo can be in the form of sensor information from the ultrasonic sensor, i.e. as a measured signal time-of-flight of a reflected ultrasound pulse, a distance indication determined from it, and/or an angular position of the object. In addition, the signal with the information from a received echo can contain a distance value as the measured distance, or it can merely indicate a range, such as a nearby object, an object at a medium distance, or a far away object. Each signal with the information from a received echo can be transmitted to an ultrasonic sensor as the master or to a final ultrasonic sensor in the chain, so that the respective ultrasonic sensor can control a signalling unit accordingly. This ultrasonic sensor can also perform a joint evaluation of the received echoes.

In an advantageous design of the invention, the distance detection system has a switch connected between the supply voltage and the first ultrasonic sensor in the chain, the switch being designed for coupling to an actuating device of the vehicle for engaging a reverse gear. Due to the coupling with the actuating device, the distance detection system can be activated as required when manoeuvring, particularly when reversing. This applies in particular to a distance detection system mounted on the rear of the vehicle, but also in principle to a distance detection system on the front of the vehicle. A distance detection system on the front of the vehicle may require an additional switch to activate the distance detection system. The actuating device is a gear lever, for example, but can also be a device which is moved via the gear lever, for example as part of a gear shift linkage.

In an advantageous embodiment of the invention, the distance detection system is designed for connection to a power supply of a reversing light of the vehicle as a supply voltage. This means that in the case of a distance detection system located in a rear of the vehicle, in which the ultrasonic sensors are installed in a rear bumper, for example, power can be supplied automatically as required when the vehicle is reversing. If the reversing light is not switched on, the distance detection system is not supplied with electrical power and remains inactive. This design is also advantageous because the power supply to the reversing light is located in close proximity to the distance detection system located in the boot of the vehicle, so that only a short cable length is required. Also, the signalling unit, such as a tone generator, can also be connected to the distance detection system in a rear part of the vehicle via short cable paths.

The invention is explained in more detail below with reference to the attached drawing and on the basis of preferred embodiments. The features described can represent an aspect of the invention both individually and in combination. Features of different exemplary embodiments can be transferred from one exemplary embodiment to another.

Figure 2:
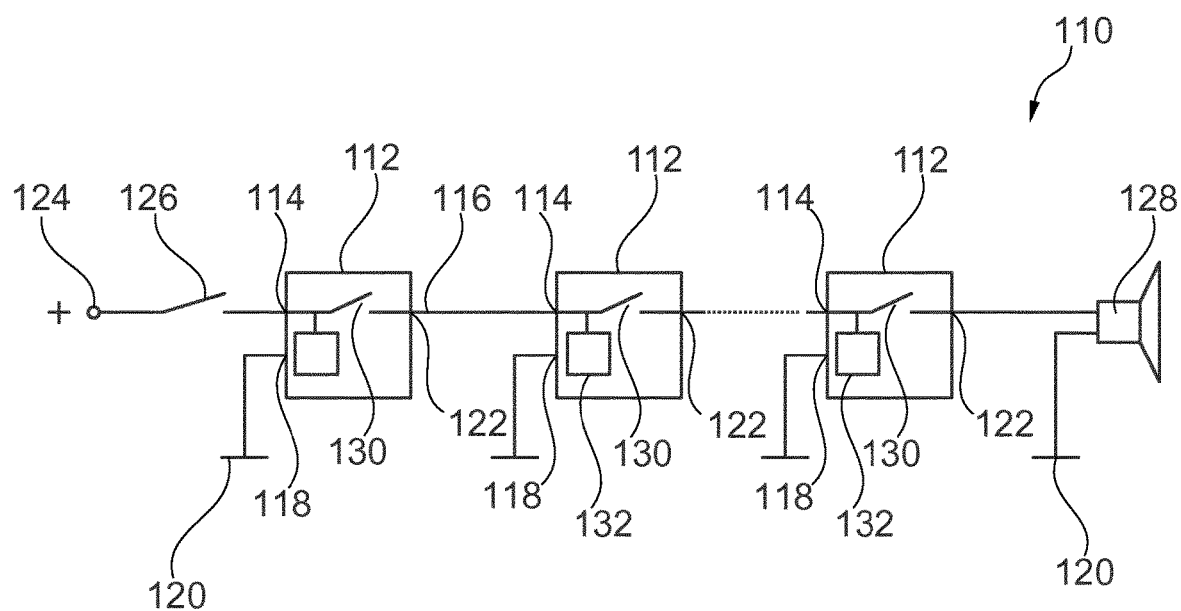
Figure 3:
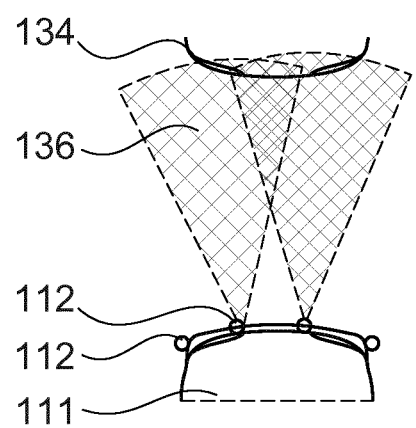

Shown in the drawings are:

FIG. 1 a schematic view of a distance detection system having a plurality of ultrasonic sensors and a jointly controlled warning unit according to the prior art, FIG. 2 a schematic view of a distance detection system having a plurality of ultrasonic sensors and a jointly controlled signalling unit according to a first, preferred embodiment, and FIG. 3 a schematic view of the distance detection system from FIG. 2 with the ultrasonic sensors mounted on a bumper of a vehicle and with a detection of an object at a distance.

FIG. 2 shows a distance detection system 110 for a vehicle 111 according to a first, preferred embodiment.

The distance detection system 110 comprises a plurality of ultrasonic sensors 112, which are interconnected in the form of a chain. Each ultrasonic sensor 112 has a standard structure with an ultrasonic diaphragm and a transducer, usually a piezoelectric transducer, to emit ultrasonic pulses 136 and receive echoes of ultrasonic pulses 136. FIG. 3 shows an arrangement of the ultrasonic sensors 112, which emit such ultrasonic pulses 136, on the vehicle 111.

Each of the ultrasonic sensors 112 has a first input 114 for connection to a supply lead 116 and a second input 118 for connection to a ground potential 120 of the vehicle 111. A two-pole supply of the ultrasonic sensor 112 is implemented via the first and second inputs 114, 118. Each ultrasonic sensor 112 also has an output 122 for connection to a supply lead 116. The ultrasonic sensors 112 are connected to the chain by connecting the output 122 of a preceding ultrasonic sensor 112 in the chain to the first input 114 of the respectively following ultrasonic sensor 112. The supply of subsequent ultrasonic sensors 112 is thus effected via all of the preceding ultrasonic sensors 112.

A first input 114 of a first ultrasonic sensor 112 in the chain is connected to a supply voltage 124. A switch 126 is arranged in the supply lead 116 between the supply voltage 124 and the first ultrasonic sensor 112 in the chain. The switch 126 is coupled to a gear lever of the vehicle 111, so that the switch 126 is closed when a reverse gear is selected.

The output 122 of the last ultrasonic sensor 112 in the chain is connected to a signalling unit 128. The signalling unit 128 is implemented here as a tone generator 128. The tone generator 128 is connected to the supply lead 116 and the ground potential 120 and generates a tone when the supply voltage 124 is applied to the supply lead 116.

Each ultrasonic sensor 112 is equipped with a switching device 130 to disconnect or conductively connect the connection lead 116 between the first input 114 and the output 122. In an initial state, the switching device 130 is open. The last ultrasonic sensor 112 in the chain can use its switching device 130 to activate the tone generator 128 by the switching device 130 connecting the supply voltage 124 through to the tone generator 128, for example in the form of pulses.

Each ultrasonic sensor 112 also has a modulator/demodulator 132 positioned between the switching device 130 and the first input 114. The modulator/demodulator 132 is designed to receive a data signal modulated on the supply lead 116 and to modulate a data signal onto the supply lead 116. When the switching device 130 is open the modulated data signal is only received via the first input 114. When the switching device 130 is closed, the modulated data signal can be received both via the first input 114 and via the output 122. The same applies to the modulation of the data signal on the supply lead 116. When the switching device 130 is closed, the modulated data signal is provided both via the output and via the first input.

Furthermore, each ultrasonic sensor 112 has a memory with predefined positions for arranging the ultrasonic sensor 112 in the chain of ultrasonic sensors 112. The memory contains vehicle-specific information regarding the predefined positions of the ultrasonic sensors 112 in the chain and—as a result—on the vehicle 111. The memory is implemented as a lookup table and additionally contains information regarding specified measurement sequences for carrying out distance measurements according to the position of an ultrasonic sensor 112 in the chain and on the vehicle 111.

Each ultrasonic sensor 112 is designed to initialize its position in the chain of ultrasonic sensors 112 based on the receipt of the initialization message and on the predefined positions in the memory. The first ultrasonic sensor 112 in the chain is activated when the switch 126 is closed. Its switching device 130 is open, so that downstream ultrasonic sensors 112 initially remain de-energized and thus inactive. The activated first ultrasonic sensor 112 starts its initialization when the supply voltage 124 is applied to its first input 114 via the supply lead 116.

Each ultrasonic sensor 112 is designed to receive an initialization message as a modulated data signal on the supply lead 116. The first ultrasonic sensor 112 detects the absence of the initialization message, so that the ultrasonic sensor 112 recognizes that it must be the first ultrasonic sensor 112 in the chain. The first ultrasonic sensor 112 is initialized accordingly after a timer has expired, based on the absence of the initialization message.

The first ultrasonic sensor 112 performs the initialization based on the information in the memory for the first ultrasonic sensor 112. In addition, the first ultrasonic sensor 112 closes its switching device 130 after initialization, so that via its output 122 the supply voltage 124 is switched through to the first input 114 of the subsequent ultrasonic sensor 112. Accordingly, the following ultrasonic sensor 112 is activated and starts its initialization. After closing the switching device 130, the first ultrasonic sensor 112 sends an initialization message as a modulated data signal on the supply lead 116, which is received by the following ultrasonic sensor 112 and is used as the basis for initializing the latter. Each ultrasonic sensor 112 signals its position in the chain in its initialization message.

Subsequent ultrasonic sensors 112 are initialized sequentially in the order of their position in the chain. The initialization procedure is basically the same as that described above with regard to the first and second ultrasonic sensor 112. The ultrasonic sensors 112 are assigned to their respective position in the chain. This is used in turn to assign the positions of the ultrasonic sensors 112 on the vehicle 111.

If an ultrasonic sensor 112 detects during its initialization that it is the last ultrasonic sensor 112 in the chain of ultrasonic sensors 112, the initialization is completed without the switching device 130 of the last ultrasonic sensor 112 being closed. No initialization message is sent by this ultrasonic sensor 112 either. Instead, the last ultrasonic sensor 112 of the chain is initialized and configured to activate the tone generator 128 via its switching device 130, by activating the tone generator 128 with a desired frequency and amplitude.

In operation, i.e. after initialization, the distance detection system 110 is configured to perform a synchronized distance measurement with a plurality of ultrasonic sensors 112. Ultrasonic pulses 136 can be emitted by each ultrasonic sensor 112 to detect an object 134, as shown schematically in FIG. 3. The synchronized distance measurement takes into account the signal paths of emitted ultrasonic pulses 136 which are received by the same ultrasonic sensor 112, as well as indirect echoes of ultrasonic pulses 136, i.e. one of the ultrasonic sensors 112 emits ultrasonic pulses 136, and at least one other ultrasonic sensor 112 receives indirect echoes based on them. Knowing the positions of the ultrasonic sensors 112 in the chain and the position of the ultrasonic sensors 112 on the vehicle 11, for example, a trilateration is carried out on the basis of echoes received with different ultrasonic sensors 112 and the resulting distances of objects 134. The distance detection system 110 can also perform a measurement sequence with a plurality of distance measurement ultrasonic sensors 112, wherein the ultrasonic sensors 112 perform the measurement sequence jointly depending on their position in the chain.

In the distance measurement carried out in this way, a distance signal is emitted from each ultrasonic sensor 112 as a modulated data signal on the supply lead 116. The distance signal contains sensor information of the respective ultrasonic sensor 112, for example, a signal time-of-flight of reflected ultrasonic pulses 136 and/or a distance indication of the object 134 determined from it. The modulated data signal with the distance signal is also received by the last ultrasonic sensor 112 of the chain, so that the last ultrasonic sensor 112 drives the tone generator 128 based on this signal in order to output the distance to the object 134 acoustically.

In an alternative embodiment, the distance detection system 110 is designed for connecting directly to a supply voltage of a reversing light of the vehicle 111 as a supply voltage 124. A switch 126 for activating the ultrasonic sensors 112 by applying the supply voltage 124 can then be omitted. In addition, the initialization and subsequent operation of the ultrasonic sensors 112 of the distance detection system 110 take place as described above.

LIST OF REFERENCE SIGNS 10 distance detection system (prior art)
12 ultrasonic sensor (prior art)
14 supply lead (prior art)
16 ground (prior art)
18 supply voltage (prior art)
20 warning unit (prior art)
22 switch (prior art)
110 distance detection system
112 ultrasonic sensor
114 first input
116 supply lead
118 second input
120 ground potential
122 output
124 supply voltage
126 switch
128 signalling unit, tone generator
130 switching device
132 modulator/demodulator
134 object
136 ultrasonic pulse

The invention claimed is:
1. An ultrasonic sensor for use in a distance detection system for a vehicle, wherein the ultrasonic sensor is configured to be installed jointly with at least one other ultrasonic sensor, the ultrasonic sensor comprising:
- a first input for connection to a supply lead;
- a second input for connection to a ground potential of the vehicle; and
- an output for connection to the supply lead,
- wherein the ultrasonic sensor receives a data signal modulated onto the supply lead via the first input, and to modulate a data signal onto the supply lead via the output, and
- wherein the ultrasonic sensor receives an initialization message as a modulated data signal on the supply lead and issues an initialization message as a modulated data signal on the supply lead.

2. The ultrasonic sensor according to claim 1, wherein the ultrasonic sensor receives a data signal modulated onto the supply lead via the output, and to modulate a data signal onto the supply lead via the first input.

3. The ultrasonic sensor according to claim 1, further comprising:
- a memory with predefined positions for arranging the ultrasonic sensor in a chain of ultrasonic sensors,
- wherein the ultrasonic sensor initializes a position in the chain of ultrasonic sensors based on receipt of the initialization message and the predefined positions in the memory.

4. The ultrasonic sensor according to claim 1, wherein the ultrasonic sensor performs an initialization when a supply voltage is applied to the first input.

5. The ultrasonic sensor according to claim 4, further comprising:
- a switching device to disconnect or connect in a conductive manner a connection lead between the first input and the output,
- wherein the switching device is open in an initial state, and
- wherein the ultrasonic sensor is configured to close the switching device after the initialization.

6. The ultrasonic sensor according to claim 5, wherein the ultrasonic sensor initializes a position in a chain of ultrasonic sensors and activates a signalling unit via a switching device when initializing the position as a last ultrasonic sensor of the chain.

7. A distance detection system for a vehicle having a plurality of ultrasonic sensors according to claim 1, wherein the ultrasonic sensors are connected to each other in a form of a chain, the output of a preceding ultrasonic sensor is connected to the first input of a subsequent ultrasonic sensor, a first ultrasonic sensor in the chain is connected with a first input of the first ultrasonic sensor to a supply voltage, and a final ultrasonic sensor in the chain is connected with an output of the final ultrasonic sensor to a signalling unit.

8. The distance detection system of claim 7, wherein one of the plurality of ultrasonic sensors is configured as a master in order to control the ultrasonic sensors jointly.

9. The distance detection system according to claim 8, wherein the distance detection system is for connecting to a supply voltage of a reversing light of the vehicle as a supply voltage.

10. The distance detection system of claim 7, wherein the ultrasonic sensors are arranged and designed to perform a sequential initialization in a sequence of their concatenation.

11. The distance detection system according to claim 7, wherein the distance detection system performs a synchronized distance measurement with a plurality of ultrasonic sensors.

12. The distance detection system according to claim 7, wherein the distance detection system performs a measurement sequence with a plurality of ultrasonic sensors, and the ultrasonic sensors perform the measurement sequence together depending on their position in the chain.

13. The distance detection system according to claim 7, wherein the distance detection system performs an ultrasonic measurement, at least one of the ultrasonic sensors emits an ultrasonic pulse, and one or more of the ultrasonic sensors are designed to send a signal including information of a received echo of the ultrasonic pulse emitted by the at least one of the ultrasonic sensors as a modulated data signal on the supply lead.

14. The distance detection system according to claim 7, further comprising:
- a switch connected between the supply voltage and the first ultrasonic sensor in the chain,
- wherein the switch is for coupling to a control device of the vehicle for selecting a reverse gear.

* * * * *